Oct. 2, 1962    J. LEYENBERGER ETAL    3,056,936
MEASURING APPARATUS

Filed Aug. 23, 1960    3 Sheets-Sheet 1

INVENTORS.
JOHN LEYENBERGER
JOHN D. McGHEE
BY
Arthur H. Swanson
ATTORNEY.

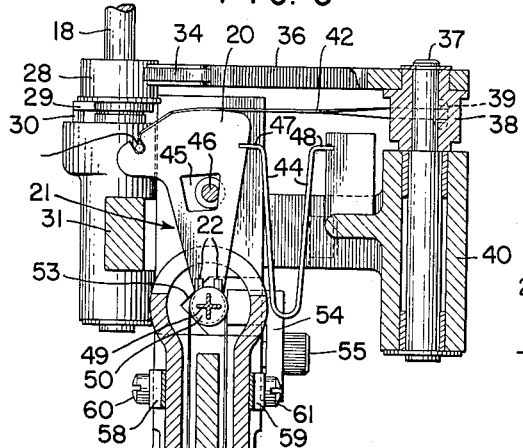
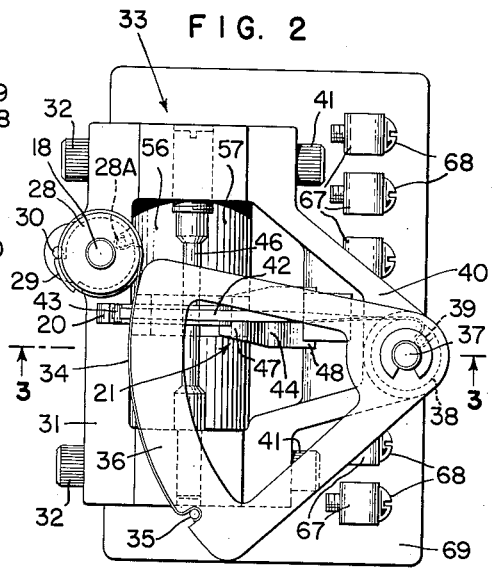
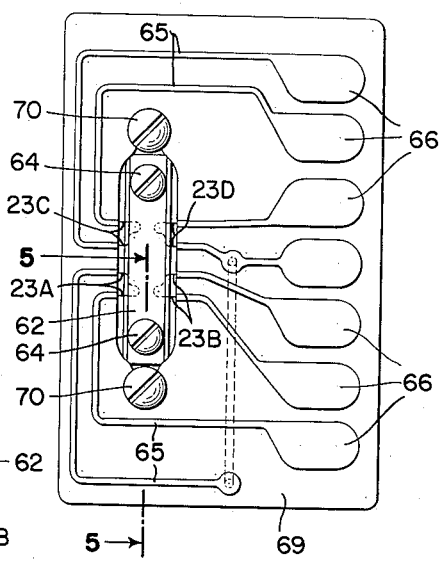
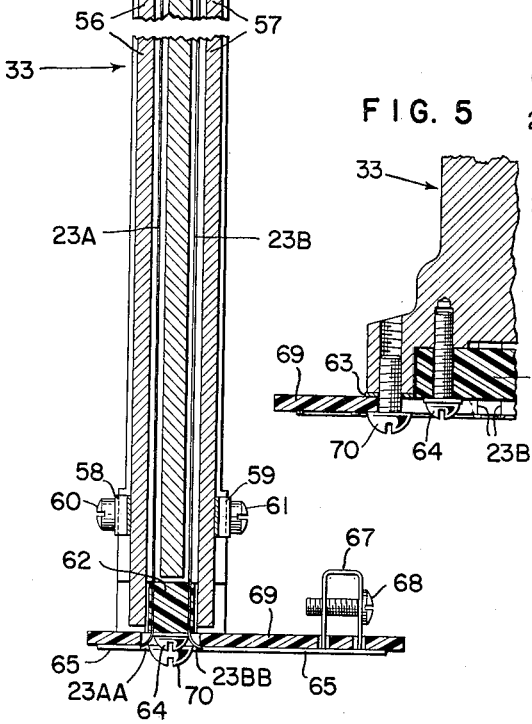

Oct. 2, 1962  J. LEYENBERGER ETAL  3,056,936
MEASURING APPARATUS
Filed Aug. 23, 1960  3 Sheets-Sheet 3

INVENTORS.
JOHN LEYENBEGER
JOHN D. McGHEE
BY Arthur H. Swanson
ATTORNEY.

United States Patent Office 3,056,936
Patented Oct. 2, 1962

3,056,936
MEASURING APPARATUS
John Leyenberger, Willow Grove, and John D. McGhee, Philadelphia, Pa., assignors to Minneapolis-Honeywell Regulator Company, Minneapolis, Minn., a corporation of Delaware
Filed Aug. 23, 1960, Ser. No. 51,317
19 Claims. (Cl. 338—67)

This invention relates to improvements in self-balancing potentiometer, more specifically, the feed-back element of the potentiometer. This feed-back element comprises a transducer having a mechanical, angular motion as its input and an electric signal as its output. This mechanical input movement causes a change in the length of one or more free strain gage wires and therefore varies the resistance of this wire which causes a variation in the voltage output of the circuit to which this wire is connected.

Since the input motion is much larger than the motion of the wire a motion-reducing mechanism may be employed. This motion-reducing mechanism comprises a gear and pulley drive which provides one stage of motion reduction and a strap and drum drive which accomplishes motion reduction in two stages. The output of the motion-reducing mechanism is applied to a drum or sector mounted on a torsion pivot of cruciform shape having a true turning axis which does not shift with the amount of rotation. One portion of each of the strain gage wires is mounted on a cylindrical hub of the sector so as to be movable about the axis of the pivot. The end of each of the strain gage wires is mounted on a stationary block of insulation at the base of a frame. Electrical connections are provided whereby the wires may be connected so that they form the four legs of a Wheatstone bridge. Rotation of the sector causes two of the wires to increase in resistance and two of the wires to decrease in resistance.

The device of this invention has the following advantages:

It acts exceedingly rapidly so that there is no lag time to cause dynamic errors.

The strain gage wires are reliable, accurate elements which have better linearity than a slide wire and which consequently give a smooth curve following feed-back without the erratic signals which a slide wire gives.

Extra strain gage wires can be added for transmitting signals to other instruments or for control with no additional load on the balancing system.

Any problem of corrosion is eliminated by coating.

There are no contacts which wear and cause a shift in calibration and which bounce and cause erratic response.

The Wheatstone bridge comprised of the strain gage wires is readily adaptable to multi span and multi suppression, either continuous or in steps.

The strain gage wires do not wear and can be applied to loads having a frequency up to 50,000 cycles per second without affecting output accuracy or response.

It is, therefore, an object of this invention to provide an electric potentiometer having a feed-back element comprising a motion-to-electric-signal transducer.

An additional object of this invention is to provide a transducer having a motion-reducing mechanism.

It is a further object of this invention to provide a transducer having a torsion pivot of cruciform shape.

It is still another object of this invention to provide a transducer having free strain gage wires.

It is yet an additional object of this invention to provide a transducer having free strain gage wires having a flexible connection between the ends of each of the wires and a stationary contact attached to each end.

A better understanding of the present invention may be had from the following detailed description when read in connection with the accompanying drawings, in which:

FIG. 2 is a top or plan view.

FIG. 3 is a vertical, longitudinal, cross section on line 3—3 of FIG. 2 as viewed in the direction of the arrows.

FIG. 4 is a bottom view.

FIG. 5 is a vertical, cross section on an enlarged scale on line 5—5 of FIG. 4 as viewed in the direction of the arrows.

A potentiometer employing a slide wire, over which the potentiometer of this invention is an improvement, is shown in U.S. Patent 2,423,540 to W. P. Wills, assignor to the owner of this invention. An improved potentiometer instrument employing the transducer of this invention is shown in the co-pending application of John D. McGhee, Serial No. 51,378, filed August 23, 1960.

Figure 6:
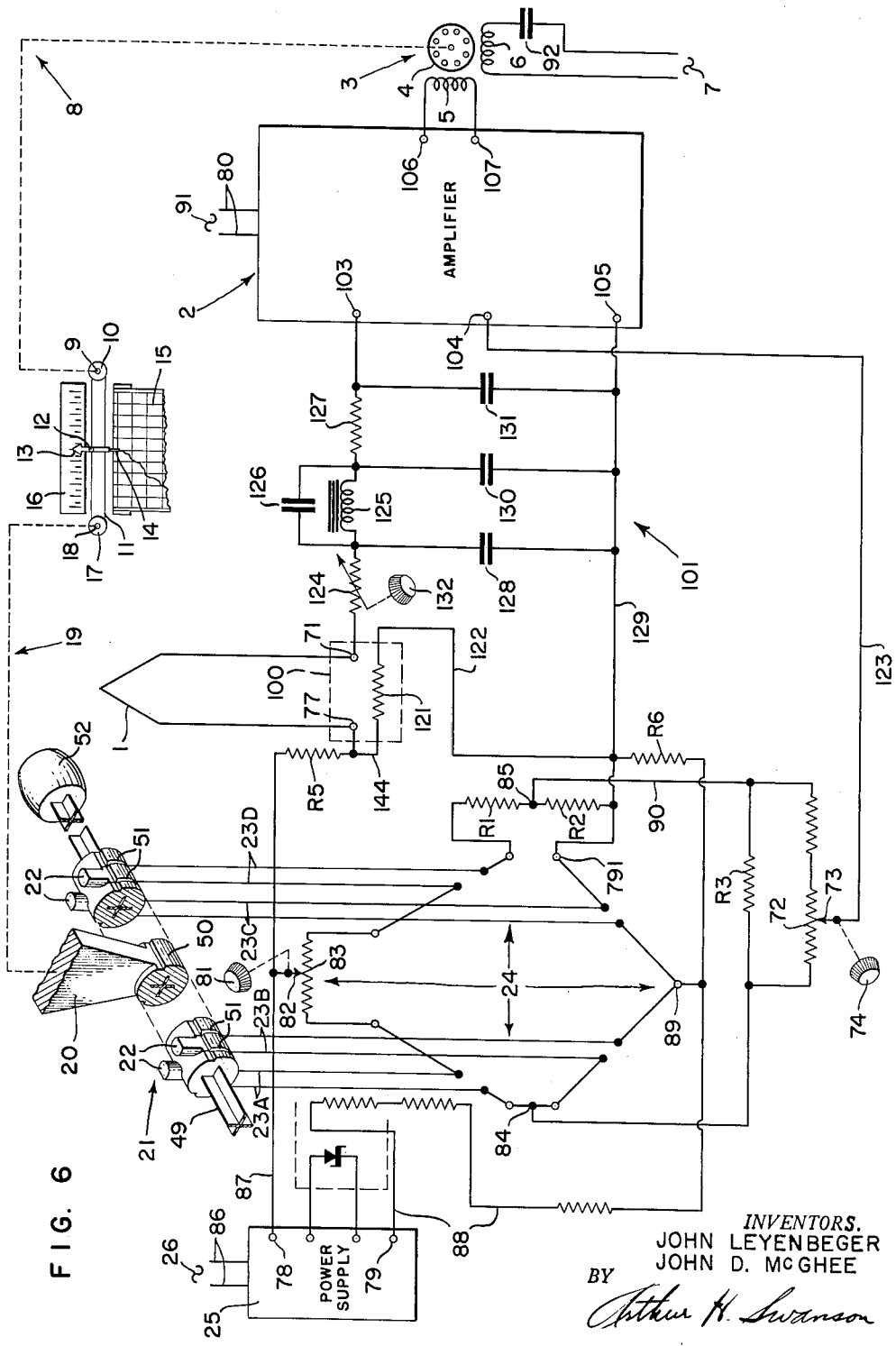
FIG. 6 is an electric circuit diagram showing the torsion pivot in exploded perspective.

FIG. 6 shows a circuit including a thermocouple 1 electrically connected to an amplifier 2 and to an electric motor 3. Motor 3 comprises a rotor 4, control windings 5, and power windings 6 connected to a source of electricity 7, which may be commercially available electricity, conveniently of 110–115 volts, 60 cycles, through a condenser 92. The way in which a change in the electric signal applied to the control winding 5 produces movement of the rotor 4 and, consequently, mechanical output of the motor, 3 is explained in the Wills patent, referred to above.

Mechanically attached to rotor 4 is a train of gearing terminating in an output shaft on which is mounted a pulley 10.

Trained around pulley 10 is a flexible cable 11 having a connection 12 to an indicator 13, cooperating with a scale 16, and with a pen 14, cooperating with a chart 15. Cable 11 is also trained around and drives pulley 17 mechanically connected to shaft 18.

Shaft 18 forms the input to a motion-reduction mechanism, generally indicated 19. Pulley 17 has a larger radius than shaft 18, so that the circumferential-motion applied to pulley 17 produces a smaller circumferential-motion of shaft 18. This is the first stage of a three-stage motion-reducing mechanism, generally indicated 19.

Mechanism 19 has its output connected to a sector 20 mounted on a torsion pivot, generally indicated 21. Sector 20 has a cylindrical hub from which project pins 22 around which are trained the movable portions of strain gage wires 23A, 23B, 23C and 23D. The stationary ends of these strain gage wires are connected into a Wheatstone bridge 24. The Wheatstone or balancing bridge circuit has a first input or energizing terminal 82 to which the resistance wires 23A and 23D are connected and has a second input or energizing terminal 89 to which the resistance wires 23B and 23C are connected. The bridge circuit also has a first output terminal 84 to which the wires 23A and 23B are connected and a second output terminal 85 to which the wires 23C and 23D are connected.

Bridge circuit 24 is supplied with energizing voltage and current from a power supply 25, which has input conductors 86 adapted to be connected to a suitable source of electricity 26. When direct current electricity is to be measured, such as the voltage produced by the thermocouple, 1, source 26 is a direct current source of electricity, such as a cell or battery. When alternating current electricity is to be measured as by being connected to the input terminals 71 and 77, the source 26 may be alternating current electricity, such as commercially available electricity, 110–115 volts, 60 cycles.

The effective or balancing output of the bridge 24 appears between output terminals 84 and 85.

The comparison of the balancing voltage to the unknown voltage to be measured is accomplished by applying these two voltages in series opposition in a measuring circuit or network to the input of the amplifying and motor-driving means 2. One of the input terminals 103 of the amplifier 2 is connected to the measuring circuit input terminal 71 while the other input terminal 104 is connected to the output terminal 85 by way of conductor 123, pointer 73, wire 72 and conductor 90.

The polarities of the balancing and unknown voltages in the series circuit of the measuring network are made to be such that, when the balancing voltage between the output terminals 84 and 85 is equal to the unknown voltage between the input terminals 71 and 77, zero resultant or error voltage will be applied by the network output to the input terminals 103 and 104 of the amplifier 2.

The amplifier 2 may be any of the known amplifying and motor driving devices used in known self-balancing apparatus and capable of driving the motor 3 in response to an error signal of other than zero appearing between the input terminals 103 and 104. For example, when the unknown and balancing voltages are D.C. ones, the device 2 may be the device 17 of the aforementioned Wills patent. When the unknown and balancing voltages are A.C. ones, the amplifier 2 may be that of FIG. 38 of the aforementioned Wills patent. When the unknown voltage is greater or less than the balancing voltage, the resultant errors voltage of one or the opposite similarity or phase is applied between the input terminals 103 and 104 and causes the device to energize the motor 3 for rotation in one or the opposite direction, depending upon said polarity phase. The amplifier 2 has energizing conductors 80 which are adapted to be connected to a suitable source 91 of alternating energizing voltage. The output of the amplifier 2 for driving the motor 3 is applied to the control windings 5 of the motor 3.

The measuring element 1, the balancing or Wheatstone bridge 24, the power supply 25, the amplifier and motor driving circuit 2 and the motor 3 cause the collective strain on the resistance wires 23A, 23B, 23C and 23D and the resulting balancing voltage to be adjusted to a specific, balancing value for each different value of the voltage being measured. Since there is a corresponding, discrete condition or position of the rebalancing linkage or the train of gearing 8 for each value of the rebalancing voltage, the gearing 8 is caused to have at substantially all times a condition or position corresponding to the then-conditioning value of the voltage being measured. Accordingly, the pointer 13, which is positioned by the gearing 8 along a calibrated scale 16, provides an indication of the value of the measured voltage. Additionally, a pen 14, which is positioned along with the pointer 13 by the gearing 8 relative to a recording chart 15, provides a record of these values.

There is a corresponding, discrete value of the balancing voltage produced by the bridge 24 for each value of the strain on the strain gage wires 23A, 23B, 23C, and 23D collectively, and hence for each position of the pointer 13 along the scale 16. While this is true for any given calibration or adjustment of the range of the apparatus, it is also true that the relationship between the balancing voltage and the pen and pointer position can be varied in order to permit the apparatus to be used for measuring voltages lying within different ranges. In other words, it may, for example, be advantageous to have the low and high ends of the scale 16 correspond, respectively, to zero and one hundred millivolts at one time, and to have these ends of the scale 16 correspond, respectively, to thirty and sixty millivolts at another time. Such adjustment of the range of the apparatus is effected by adjusting the span and zero resistors.

The span adjusting resistor comprises a body 72 engaging with a pointer 73 and manually adjustable by means of a knob 74. The adjusted position of the contact 73 along the body of the resistor 72 determines the percentage of the balancing voltage output of the bridge circuit, between the terminals 84 and 85, which is actually used as the re-balancing voltage to be compared to the unknown voltage. Accordingly, the adjusted position of the contact 73 determines the span of the apparatus; that is, the number of measuring units, such as millivolts, extending between the low and high ends of the scale 16.

In addition to the span resistor 72 there is a zero adjusting resistor 83. The body of this resistor is connected between the output terminals 84 and 85 of the balancing bridge circuit. The adjustable contact 82 of this resistor is connected by wire 87 to the output terminal 78 of the power supply 25. A knob 81 permits the manual adjustment of the contact 82 along the body of the resistor 83. Such adjustment determines the value to the bridge circuit the output voltage will have for a given value of the collective strain on the wires 23A, 23B, 23C and 23D, and hence a given position of the pointer 16 and pen 14. Accordingly, the adjusted position of the contact 82 determines the so-called Zero and suppression values for the apparatus. Thus, the combination of this adjustment with the adjustment of the span resistor contact 73 determines the over-all range of the apparatus; that is, the actual values of the unknown voltage represented by the calibration marks on the scale 16 and the chart 15, from one end to the other.

The unknown input voltage from the thermocouple 1 as corrected by the device 100, as explained below, is compared with the balancing voltage between the contact 73 and the terminal 791 to form the error signal which is applied to the terminals 103 and 104. To this end, these two voltages are connected in series opposition between the terminals 103 and 104 in the comparison portion of the measuring circuit network of the apparatus. Specifically, the measuring input terminal 77 is connected through cold junction resistor 121 and a conductor 122 to the balancing voltage terminal 791, while the other balancing voltage terminal, contact 73, is connected by a conductor 123 to the input terminal 104. The remaining input terminal 103 is connected through elements of the filtering or damping circuit 101 to the remaining element input terminal 71.

The filtering and dampening circuit 101 includes, in series, between the measuring input terminal 71 and the amplifier input terminal 103, an adjustable damping resistor 124, an inductance 125 shunted by a tuning condenser 126, and a resistor 127. The junction between the resistor 124 and the inductance 125 is connected by a condenser 128 and a reference conductor 129 to the bridge output terminal 791. The conductor 129 is also connected to the reference terminal 105 of the unit 2. The condenser 130 connects the junction of the inductance 125 and the resistor 127 to the reference conductor 129. A condenser 131 connects the input terminal 103 to the junction terminal 105. This completes the filtering and damping circuit 101.

One purpose of the circuit 101, as just described, is to prevent stray signals picked up in the thermocouple 1, the measuring circuit, the strain gage wires 23A, 23B, 23C or 23D, etc., from reaching and affecting the unit 2, and hence from affecting the operation of the motor 3. This filtering action, which is produced in the general manner described in the aforementioned Wills patent, is enhanced, in the present circuit, by the presence of the tuned inductance 125, which prevents a high, blocking impedance to stray signals, such as those at 60 cycles per second, while presenting only a desirable, low impedance to the errors signals.

A second purpose of the signal 101 is to prevent a damping or anti-hunting action of the motor 3 and thus prevent the rebalancing mechanism from over-shooting the balance point as the latter is approached in each rebalancing operation. The manner in which such damping action is produced by a circuit of that type of the circuit 101 is fully described in the Harrison et al. Reissue Patent No. 23,121 and hence need not be explained further herein.

Since the amount of the damping action which the circuit 101 provides is dependent upon the resistance value of the resistor 124, the manual adjustment of the latter, as by the knob 123, changes the amount of damping obtained. Such adjustment is desirable to permit the response of the apparatus to be varied to suit particular requirements of different applications.

The cold junction assembly or device 100 is provided to compensate for the changes in the total thermocouple output voltage which results in the known manner, from the changes in the temperature of the reference or cold junction of the thermocouple 1. Such temperature changes are usually the result of changes in the ambient temperature to which the apparatus is exposed. The device 100 as shown schematically in FIG. 6 includes the input terminals 71 and 77 and the resistor 121. The magnitude of the total output voltage of a thermocouple, such as thermocouple 1, depends upon the difference between the temperatures of its hot and cold junctions. Therefore, since it is the temperature of the only hot junction which is actually to be measured by the FIG. 6 apparatus, means such as the device 100 must be provided to make the thermocouple voltage, which is the unknown voltage actually measured by the apparatus, dependent solely upon the hot junction temperature, and independent of the temperature of the cold junction.

Such compensation is effected in the FIG. 6 apparatus by constructing a device 100 so that the thermocouple cold or reference junction exists in the device 100 and by providing at the junction a temperature-sensitive resistor 121 which is at the same temperature as the cold junction. This resistor is so connected in the associated measuring circuit that it effectively modifies the total thermocouple voltage as necessary to compensate the changes in this voltage resulting from changes in the temperature on the whole junction. This is necessary to keep the net, measured thermocouple voltage a function solely of the temperature of the hot junction. The legs or lead wires 138 and 139 of the thermocouple 1 are connected to the respective terminals 71 and 77 to which are also connected the respective conductors 140 and 141 leading to the rest of the measuring circuit. By virtue of this construction, the junctions between the thermocouple wires 138 and 139 and the respective terminals 77 and 71, of a similar material, stay at the same temperature no matter how this temperature may vary. Similarly, the junctions between the circuit wires 140 and 141, of that one material, and the respective terminals 77 and 71, of said similar material, have the same temperature as that of the thermocouple-terminal junctions. The result of this is that all junctions between the similar materials in the device 100 are held at the same termperature.

Additionally, all junctions throughout the circuit connected between the conductors 140 and 141, external to the device 100, are such that changes in the temperature to which the circuit is exposed do not produce any thermal E.M.F. between the ends of the conductors 140 and 141 in the device 100. This is achieved by the use of such known techniques as employing heat sinks and symmetrical disposition for dissimilar material junctions throughout said circuit. Junctions in the circuit between the same material can, of course, be allowed to vary in temperature without generating any thermal E.M.F.

As a result of the foregoing construction, there is zero thermal E.M.F. developed between the terminals 71 and 77 of the FIG. 6 apparatus. Accordingly, the thermocouple leads 138 and 139, which are connected to these terminals, respectively, are effectively connected together from the thermal standpoint, thus forming the cold or reference junction of the thermocouple 1. Since the thermocouple cold junction is thus formed entirely within the device 100, its temperature can conveniently and accurately be sensed for compensating purposes.

Such sensing of the temperature by a thermocouple having the structure of the terminals 71 and 77, and hence of the thermocouple cold junction, is accomplished by making the temperature of the temperature-sensitive resistor 121 the same as that of the terminals 71 and 77. To this end, the temperature-sensitive resistance wire forming the resistor 121 is electrically insulated.

In order to make the changes in the temperature, and hence the resistance, of the resistor 121, compensate for thermocouple voltage changes produced by said temperature changes, means are provided in the FIG. 6 circuit for passing a known current through the resistor 121. This means includes resistors R5 and R6 which are connected in a series circuit with the resistor 121 between the bridge energizing contact 82 and terminal 89. Specifically, this circuit can be traced from the contact 82 through the resistor R5, the conductor 144, resistor 121, the conductor 122, and the resistor R6 to the terminal 89. Potential supplied to the bridge circuit between the contact 82 and the terminal 89 by the supply 25 causes a current which produces across these resistors a voltage drop whose magnitude is dependent upon the resistance of these resistors, and hence upon the temperature of the thermocouple cold junction. This current is kept substantially constant.

The resistor 121 is also connected in series with the thermocouple 1 and the balancing voltage of the series comparison circuit between the terminals 103 and 104. Therefore, the above-mentioned temperature-dependent voltage drop produce across the resistor 121 is included in this comparison circuit. This voltage drop compensates for that part of the total thermocouple voltage in the comparison circuit which is due to a change in temperature of the thermocouple cold junction. The result of this is that the net thermocouple voltage which is left to be compensated by the balancing voltage depends solely on the temperature of the thermocouple hot or measuring junction, as is desired.

Figure 1:
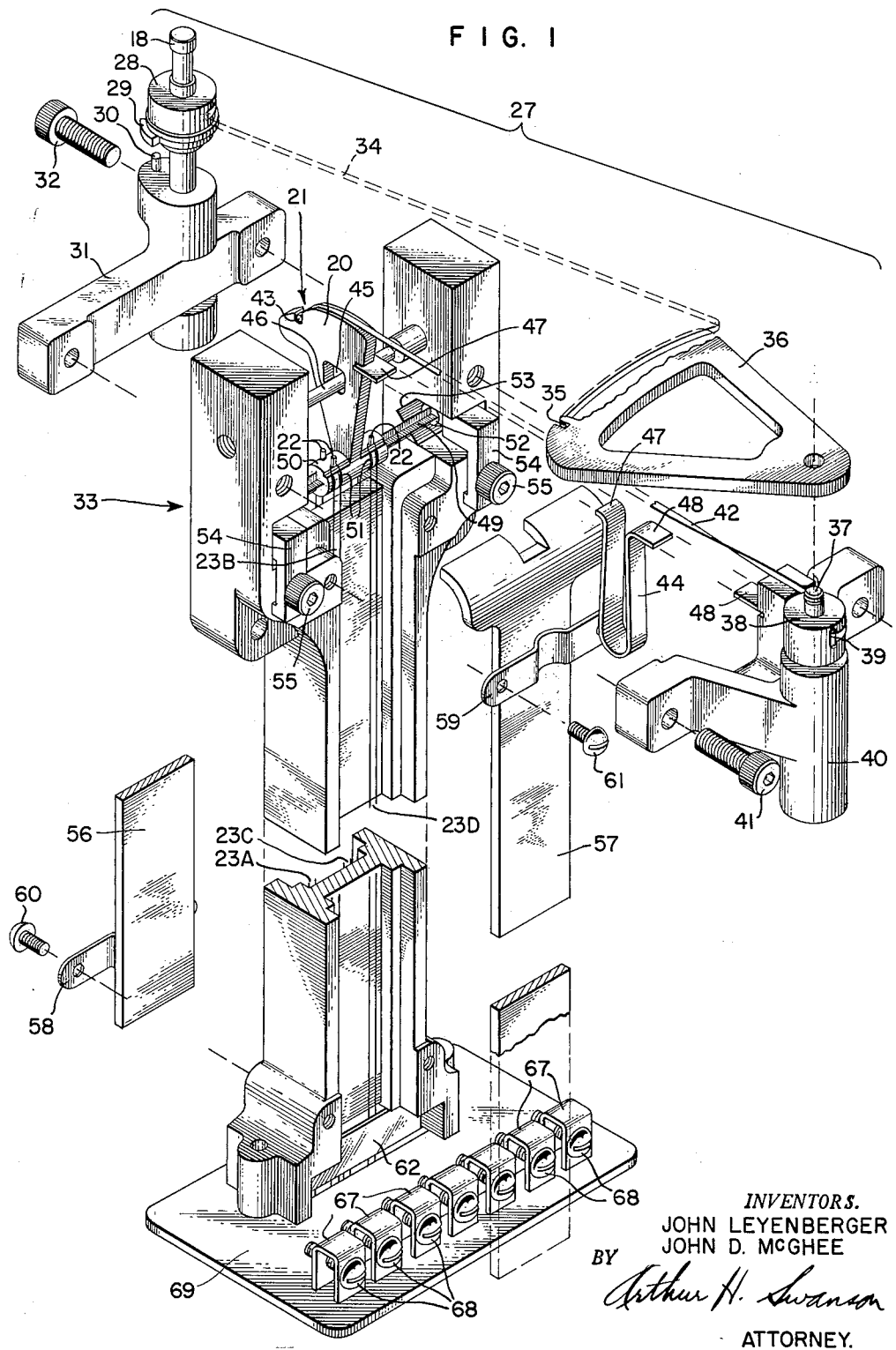
FIG. 1 is an exploded, perspective view of the transducer.

FIGS. 1, 2, 3, 4, 5 and 6 show the transducer, generally indicated 27. Shaft 18 forms the drive spindle of the transducer and has a cylindrical portion 28 on it. A movable stop 29 projects from the cylindrical portion 28 and cooperates with a stationary stop comprised of a pin 30 on the bearing bracket 31 which is connected to the stationary frame, generally indicated 33, by means of a pair of socket-headed, cap screws 32 (of which but one is shown in FIG. 1). One end of a flexible, metal strap or ribbon 34 is trained round a portion of the periphery of cylindrical portion 28 and is attached thereto by means of a pin 28A pressed in a slot in cylindrical portion 28. The opposite end of strap 34 bears on a cylindrical surface of sector 36 and is attached thereto by means of a second pin 35 fitted in a slot in the face of sector 36. Sector 36 which is connected by a press fit with driven spindle 37 which is mounted for rotation in a bearing bracket 40 attached to stationary frame 33 by a pair of socket-headed, cap screws 41 (of which but one is shown in FIG. 1). One end of a second, flexible, metal strap or ribbon 42 is trained around a portion of the periphery of cylindrical portion 38 and is attached hereto by a pin which fits in a slot in a surface of cylindrical portion 38. Second strap 42 has a ninety degree twist in it. The opposite end of second strap 42 passes over a portion of the cylindrical surface of second sector 20 and is attached to second sector 20 by means of a pin 43 which fits in a slot in the cylindrical surface of a second sector 20.

Second sector 20 has a rectangular hole 45 through it, in which is located a portion of a stop pin 46, whose ends are mounted in stationary frame 33.

A U-shaped spring 44 has one end 47 engaged in a slot in second sector 20 and its other end 48 engaged in a slot in stationary bracket 40 which forms part of frame 33.

Second sector 20 is mounted for rotation about a torsion pivot, generally indicated 21, which provides a stable, sturdy device which does not shift position. As is also seen in FIG. 6, torsion pivot 21 comprises a cruciform central portion, 49. Second sector 20 and hub 50 are located at the center of pivot 21. Clamping balls 52 (of which but one is shown in FIG. 5) are located at each end of the cruciform portion 49.

Frame 33 may be formed by casting and is massive enough to provide a stable anchor point at its bottom for the strain gage wires. Frame 33 also provides a good heat sink for the strain gage wires. The symmetry of the design coupled with this heat sink render the assembly quite stable with temperature change.

Wheatstone bridge 24 is formed of four strain gage wires 23A, 23B, 23C and 23D. These strain gage wires have their lower ends stationary and their intermediate portions trained in a loop about cylindrical hub 50 and passing over pins 22 projecting from 50. The wires lie in slots 51 in the surface of hub 50. Since the point at which the wires contact the surface of hub 50 is spaced from the axis of pivotation of cruciform portion 49, the pivot 21 forms, in effect, a lever which moves about the axis of pivotation of cruciform portion 49 as a pivot and has a movable end to which the upper portion of each of the strain gage wires is attached. The slots 51 insure that the radius of this lever is uniform with respect to each strain gage wire. Since the intermediate portion of each of the strain gage wires engages in a slot 51 and passes over part of the periphery of hub 50, the distance from the axis of pivot 21 to the wire and consequently, the leverage of the lever formed by hub 50 remains constant. Therefore the upper, intermediate portion of the wire moves in a straight line so that the strain applied to the wire varies linearly. Therefore, the resistance of the wire changes linearly.

The strain gage wires 23A, 23B, 23C and 23D are insulated from the frame 33. The intermediate portion of each of the wires is insulated from the hub 50 and the pin 22 by forming a layer of insulation on the hub 50 and on the pin 22 as by anodizing.

The ends of torsion pivot 21 are secured in frame 33 by means of slots 53 which are V-shaped lying on their sides so that one point on each of the two of the flat surfaces contacts one of two points on the surface of the balls 52. A flat face of one of two C-shaped clamps 54 contacts a third point on the surface of each of the balls 52. Clamps 54 are secured to frame 33 by socket headed, cap screw 55.

The strain gage wires from their upper ends to their lower ends are covered by plates 56 and 57, respectively, each of which is secured to frame 33 by two screws 60 or 61 of which but one of each is shown in FIG. 1.

The lower end of the strain gage wires 23A, 23B, 23C and 23D are cemented to an anchor base comprising a block 62 of ceramic by means of suitable cement. This ceramic block and this cement insulates the lower ends of the strain gage wires from the frame 33. Anchor block 62 is attached to frame 33 by screws 64. The wires are passed over the pins 22 and are fastened so that each has an equal tension when the sector 20 is positioned in the middle of its travel. Sufficient tension is applied upon the assembly of the device to insure that the loops in all the wires are still under at least 0.075% strain at the extremes of their paths of travel. It is to be noted that, upon the rotation of second sector 20 in either direction from its mid-point, the resistance of two of the strain gage wires increases and the resistance of the other two strain gage wires decreases. At zero scale, wires 23A and 23C are under minimum tension and hence minimum resistance. The reverse is true for wires 23B and 23D. At mid scale of sector 20 the resistances of all the wires are equal because all tensions are equal.

The ends of the wires assemblied to metallic paths 65 mounted on a base terminal board 69 of insulation and lead to terminal portions 66 which contact with the bottoms of U-shaped contacts 67 to which screws 68 engage. Screws 70 pass through washers 63 and engage into frame 33. Base terminal board 69 is assembled with all eight wires extending through the central hole in terminal board 69. The board must be just snug against the washers 63 between the frame 33 and the board 69. The end of each wire is then soldered to its respective metal path 65 with solder using flux. The wires are kept tight while soldering. Screws 70 are then tightened to hold the terminal board 69 to the frame 33. As the washers 63 compress, the board 69 will move toward the frame 33 thus producing the proper amount of wire slack between the anchor base 62 and the terminal board 69. Slack or bend in each wire is shown at 23AA and 23BB, the other wires being invisible in FIG. 3.

What is claimed is:

1. A motion to electricity transducer, including, a frame having V-shaped notches therein, a torsion pivot having a cruciform portion, balls secured to the ends of said cruciform portions, clamps holding said balls in said V-shaped notches in said frame so that the intermediate portion of said cruciform portion is free for rotation about its axis of pivotation, a lever mounted on the intermediate movable portion of said cruciform portion of rotation about said axis of pivotation, said lever a cylindrical hub mounted on the movable portion of said cruciform portion, and a plurality of strain gage wires each having a portion trained over a peripheral portion of said cylindrical hub and each having a stationary portion attached to a stationary portion of said frame, so that rotation of said hub varies the tension applied to said wires and consequently the resistance of said wires.

2. A motion to electricity transducer, including, a frame, a torsion pivot mounted in said frame, a lever mounted on a movable portion of said pivot for rotation about its axis of pivotation, a plurality of strain gage wires each having a portion movable by a movable portion of said lever, a block of insulation mounted in a stationary portion of said frame, means for securing a portion of said wires to said block, a base terminal board, compressable washers located between said board and said frame, and means bearing on said board and attached to said frame for compressing said washers and thereby varying the distance between said board and said frame.

3. A motion to electricity transducer, including, a frame, an input shaft mounted for rotation in said frame, a motion-reducing mechanism driven from said input shaft, a torsion pivot mounted in said frame, a lever mounted on a movable portion of said torsion pivot for rotation about its axis of pivotation, a connection between the output end of said motion-reducing mechanism and said lever, and a plurality of strain gage wires each having a portion movable by a movable portion of said lever and each having a portion attached to a stationary portion of said frame, so that rotation of said lever about its axis of pivotation varies the tension applied to each of said wires.

4. A motion to electricity transducer, including, a frame, an input shaft mounted for rotation in said frame, a motion-reducing mechanism connected so as to be driven by said input shaft, a pivot mounted in said frame, a lever mounted on said pivot for rotation about its axis of pivotation, a connection between the output end of said motion-reducing mechanism and said lever, a stop pin mounted on said frame and limiting the rotation of said lever in at least one direction of its travel, and a plurality of strain gage wires each having a portion connected to a movable portion of said lever and a portion connected to a stationary portion of said frame, so that rotation of said lever varies the tension applied to said wires.

5. A motion to electricity transducer, including a frame, an input shaft mounted for rotation in said frame, a motion-reducing mechanism having connection with said input shaft so as to be driven thereby, a pivot mounted in said frame, a lever mounted on said torsion pivot for rotation about its axis of pivotation, a spring biasing said lever in one direction of its path of travel, a connection between said motion-reducing mechanism and a movable portion of said lever so that said motion-reducing mechanism drives said lever, and a plurality of strain gage wires each having a portion connected to a movable portion of said lever and each having a portion connected to a stationary portion of said frame, so that rotation of said lever varies the tension applied to said wires in opposite senses.

6. A motion to electricity transducer, including, a frame, an input shaft mounted for rotation in said frame, a flexible strap having one portion attached to said input shaft, a sector mounted for rotation on said frame, the opposite end of said flexible strap being connected to a curved face of said sector, a torsion pivot mounted in said frame, a lever mounted on a movable portion of said torsion pivot for rotation about its axis of pivotation, a connection between said sector and a movable portion of said lever whereby said lever may be rotated by movement of said sector with a reduced motion, and a plurality of strain gage wires each having a portion connected to a movable portion of said lever and each having a portion connected to a stationary portion of said frame, so that rotation of said lever varies the tension applied to said wires.

7. A motion to electricity transducer, including, a frame, an input shaft mounted for rotation on said frame, a projection extending from rotatable surface of said input shaft, a stationary pin mounted on said frame in the path of said projection so as to form a stop therefor, a motion-reducing mechanism connected to said input shaft so as to be driven thereby, a torsion pivot mounted in said frame, a sector mounted on a movable portion of said torsion pivot for rotation about its axis of pivotation, a plurality of strain gage wires each having a portion connected to a movable portion of said sector so that rotation of said sector about its axis of pivotation varies the tension applied to each of said wires, each of said wires having another portion attached to a stationary portion of said frame, a terminal board attached to a stationary portion of said frame, and connections between the stationary ends of said wires and said terminal board.

8. An electric potentiometer, including, an electric motor, a train of gearing adapted to be driven by said electric motor, a pulley mounted so as to be driven by said train of gearing, a flexible cable trained around said pulley so as to be driven thereby, a second pulley around which said flexible cable is trained so that said cable drives said second pulley, an input shaft mechanically connected to said second pulley so as to be driven thereby, a motion-reducing mechanism connected to said input shaft so as to be driven thereby, a frame, a torsion pivot mounted on said frame, a sector mounted on a movable portion of said torsion pivot for rotation about the axis of pivotation of said pivot, a connection between the output of said motion-reducing mechanism and said sector so that said sector is driven by said motion-reducing mechanism, a plurality of strain gages each having a portion attached to a movable portion of said sector and each having a portion attached to a stationary portion of said frame, so that rotation of said sector about its axis of pivotation increases the tension on at least one of said wires and decreases the tension on at least another of said wires, a ceramic block mounted on a stationary portion of said frame and receiving the stationary ends of said wires therein, and a terminal board of insulating material mounted on a portion of said frame adjacent to said ceramic block and receiving the stationary ends of said wires thereon.

9. An electric potentiometer, including, an electric motor, a train of gearing driven by said electric motor, a first pulley driven by the output of said train of gearing, a flexible cable trained around said pulley so as to be driven thereby, a second pulley around which a flexible cable is trained so as to drive second pulley, an input shaft mechanically connected to said second pulley so as to be driven thereby, a flexible strap connected to a portion of the periphery of said shaft so as to be driven thereby, a first sector connected to a portion of said flexible strap spaced from the input shaft so that said flexible strap rotates said sector at a reduced motion, a frame, a torsion pivot mounted on said frame, a second sector mounted on a movable portion of said torsion pivot and having connections with said first sector so as to be driven thereby, a plurality of strain gage wires each having a portion connected to a movable portion of said second sector and each having a portion connected to a stationary part of said frame, a ceramic block attached to a stationary portion of said frame and to the stationary ends of said wires, a terminal board of insulating material connected to said frame adjacent said ceramic block and having connection with the stationary ends of said wires, a plurality of flexible washers located between said terminal board and said washers so that compressing said washers stresses said terminals board against said frame, and a plurality of covers secured to said frame and covering the portions of said wires between said sector and said stationary ends of said wires.

10. An electric potentiometer, including, an electric motor, a frame, a motion-reducing mechanism connected to said electric motor so as to be driven thereby, a torsion pivot mounted on said frame, a sector mounted on a movable portion of said torsion pivot for rotation about the axis of pivotation of said pivot, a connection between said motion-reducing mechanism and said sector so that said sector is driven by said motion-reducing mechanism, and a plurality of strain gages each having a portion attached to a movable portion of said sector and each having a portion attached to a stationary portion of said frame, so that rotation of said sector about its axis of pivotation increases the tension on at least one of said wires and decreases the tension on at least another of said wires.

11. An electric potentiometer, including, an electric motor, gearing driven by said motor, a motion-reducing mechanism connected to said gearing so as to be driven thereby, a frame, a torsion pivot mounted on said frame, a sector mounted on a movable portion of said torsion pivot for rotation about the axis of pivotation of said pivot, a connection between said motion-reducing mechanism and said sector so that said sector is driven by said motion-reducing mechanism, and a plurality of strain gages each having a portion attached to a movable portion of said sector, and each having a portion attached to a stationary part of said frame, so that rotation of said sector about its axis of pivotation increases the tension on at least one of said wires and decreases the tension on at least another of said wires.

12. An electric potentiometer, including, an electric motor, a frame, a torsion pivot mounted on said frame, a lever mounted on a movable portion of said torsion pivot for rotation about the axis of said pivot, a connection between said electric motor and said lever so that said lever is driven by said electric motor, and a strain gage wire having one portion attached to the movable portion of said lever and another portion attached to the stationary portion of said frame, whereby rocking movement of said lever varies resistance to said wire.

13. An electric potentiometer, including, an electric motor, a frame having V-shaped notches therein, a torsion pivot having a cruciform portion, balls secured to the ends of said cruciform portion, clamps holding said balls in V-shaped notches in said frame so that the intermediate portion of said cruciform portion is free for rotation about its axis of pivotation, a lever mounted on said intermediate movable portion of said cruciform portion for rotation about said axis of pivotation, said lever having a cylindrical hub mounted on the movable portion of said cruciform portion, a connection between said electric motor and said lever so that said lever is driven by said electric motor, and a plurality of strain gage wires each having a portion trained over a portion of said cylindrical hub and each having a stationary portion attached to a stationary portion of said frame, so that rotation of said hub varies the tension applied to said wires and consequently the resistance of said wires.

14. An electric potentiometer, including, an electric motor, a frame, an input shaft mounted for rotation on said frame, a connection between said electric motor and said input shaft so that said input shaft is driven by said electric motor, a motion-reducing mechanism driven from said input shaft, a torsion pivot mounted on said frame, a lever mounted on a movable portion of said torsion pivot for rotation about its axis of pivotation, an output connection between said motion-reducing mechanism and said lever, and a plurality of strain gage wires each having a portion attached to a movable portion of said lever and each having a portion attached to a stationary portion of said frame, so that rotation of said lever about its axis of pivotation varies the tension applied to each of said wires.

15. An electric potentiometer, including, an electric motor, a frame, an input shaft mounted for rotation in said frame, a connection between said electric motor and said input shaft so that said electric motor drives said input shaft, a flexible strap having one portion attached to said input shaft, a sector mounted for rotation on said frame, the opposite end of said flexible strap being connected to a curved face of said sector, a torsion pivot mounted in said frame, a lever mounted on a movable portion of said portion pivot for rotation about its axis of pivotation, a connection between said sector and a movable portion of said lever whereby said lever may be rotated by movement of said sector with a reduced motion, and a plurality of strain gage wires each having a portion connected to a movable portion of said lever and each having a portion connected to a stationary portion of said frame, so that rotation of said lever varies the tension supplied to said wires.

16. An electric potentiometer, including, an electric motor, a frame, motion-reducing mechanism mounted on said frame and having connection with said electric motor so that said electric motor drives said motion-reducing mechanism, a torsion pivot mounted in said frame and having a part movable for rotation about its axis, a lever mounted on the movable portion of said torsion pivot for rotation about said axis of pivotation, said lever having a cylindrical hub on the movable portion thereof, and a plurality of strain gage wires each having a portion trained over a portion of said cylindrical hub and a portion connected to a stationary part of said frame, so that the rotation of said hub varies the tension applied to said wires and consequently the resistance of said wires.

17. A motion to electricity transducer, including, a frame, a torsion pivot mounted in said frame and having a fixed axis of pivotation, a lever mounted on the movable portion of said torsion pivot for oscillation about said axis of pivotation and having a cylindrical hub concentric with said axis of pivotation, and a plurality of strain gauge wires each having a portion trained over and insulated from a peripheral portion of said cylindrical hub and each having a stationary portion attached to a stationary portion of said frame, so that rotation of said hub varies the tension applied to said wires and consequently the resistance of said wires.

18. A motion to electricity transducer, including a frame, a torsion pivot having a fixed axis of pivotation and mounted on said frame, a lever having a cylindrical hub concentric with said axis of pivotation and mounted on a movable portion of said torsion pivot for rocking motion about said axis of pivotation, pins projecting from said cylindrical hub, and a plurality of strain gauge wires each having a portion insulated from and trained over a peripheral portion of said cylindrical hub and one of said pins and each having a stationary portion attached to a stationary portion of said frame, so that rocking motion of said hub varies the tension applied to said wires and consequently the resistance of said wires.

19. A motion to electricity transducer, including, a frame, a torsion pivot have a fixed axis of pivotation and mounted on said frame, a lever having a cylindrical hub portion concentric with said axis of pivotation and mounted on a movable portion of said torsion pivot for rocking motion about said axis of pivotation and having slots in said cylindrical hub, and a plurality of strain gauge wires each insulated from said cylindrical hub and having a portion trained over a peripheral portion of said cylindrical hub and in at least one of said slots and each having a stationary portion attached to a stationary portion of said frame, so that rotation to said hub varies the tension applied to said wires and consequently the resistance of said wires.

References Cited in the file of this patent
UNITED STATES PATENTS

| | | |
|---|---|---|
| 2,889,527 | Statham | June 2, 1959 |
| 2,906,980 | Traite | Sept. 29, 1959 |